United States Patent
Bates et al.

(10) Patent No.: US 8,744,651 B2
(45) Date of Patent: Jun. 3, 2014

(54) METHOD OF DETERMINING A MANEUVER PERFORMED BY AN AIRCRAFT

(75) Inventors: Preston R. Bates, Fort Worth, TX (US); Mark W. Davis, Southbury, CT (US); James Peter Cycon, Media, PA (US); Payman Sadegh, Arlington, VA (US)

(73) Assignee: Sikorsky Aircraft Corporation, Stratford, CT (US)

( * ) Notice: Subject to any disclaimer, the term of this patent is extended or adjusted under 35 U.S.C. 154(b) by 546 days.

(21) Appl. No.: 13/030,582

(22) Filed: Feb. 18, 2011

(65) Prior Publication Data

US 2011/0264310 A1  Oct. 27, 2011

Related U.S. Application Data

(60) Provisional application No. 61/342,970, filed on Apr. 21, 2010.

(51) Int. Cl.
*G01C 21/20* (2006.01)
(52) U.S. Cl.
USPC ....... 701/14; 701/3; 701/4; 701/500; 701/505
(58) Field of Classification Search
None
See application file for complete search history.

(56) References Cited

U.S. PATENT DOCUMENTS

| | | | | |
|---|---|---|---|---|
| 6,226,597 | B1* | 5/2001 | Eastman et al. | 702/34 |
| 6,278,920 | B1* | 8/2001 | Hebberd | 701/29.3 |
| 6,768,938 | B2* | 7/2004 | McBrien et al. | 701/100 |
| 7,103,507 | B2* | 9/2006 | Gorinevsky et al. | 702/184 |
| 7,308,614 | B2* | 12/2007 | Kojori | 714/47.2 |
| 7,702,435 | B2* | 4/2010 | Pereira et al. | 701/30.8 |
| 7,860,664 | B2* | 12/2010 | Loomis et al. | 702/35 |
| 8,090,824 | B2* | 1/2012 | Tran et al. | 709/224 |
| 8,131,420 | B2* | 3/2012 | Lynch et al. | 701/32.7 |
| 8,170,968 | B2* | 5/2012 | Colclough et al. | 706/45 |
| 8,201,424 | B2* | 6/2012 | Bodden et al. | 70/34 |
| 8,285,438 | B2* | 10/2012 | Mylaraswamy et al. | 701/29.9 |
| 8,335,601 | B2* | 12/2012 | Sham et al. | 701/3 |
| 8,346,429 | B2* | 1/2013 | Nwadiogbu et al. | 701/31.4 |
| 8,346,700 | B2* | 1/2013 | Nwadiogbu et al. | 706/46 |
| 8,467,913 | B2* | 6/2013 | Geiter | 701/3 |
| 8,478,479 | B2* | 7/2013 | Ghelam | 701/31.9 |
| 2002/0018716 | A1* | 2/2002 | Kennedy et al. | 416/25 |
| 2003/0187554 | A1* | 10/2003 | Henry et al. | 701/29 |
| 2004/0176887 | A1* | 9/2004 | Kent et al. | 701/30 |
| 2004/0176902 | A1* | 9/2004 | McBrien et al. | 701/100 |
| 2004/0193386 | A1* | 9/2004 | Flynn et al. | 702/173 |

(Continued)

FOREIGN PATENT DOCUMENTS

EP  23296064 A2  3/2001

OTHER PUBLICATIONS

Grabill, P. et al, "Helicopter Structural Life Modeling: Flight Regime and Gross Weight Estimation", Aerospace Conference, 2007, IEEE, IEEE, Piscataway, NJ, USA, Mar. 3, 2007, pp. 1-9.

(Continued)

*Primary Examiner* — Jonathan M Dager
(74) *Attorney, Agent, or Firm* — Cantor Colburn LLP

(57) ABSTRACT

A method of determining a maneuver performed by an aircraft having sensors for monitoring motion data, the method including periodically sampling the sensors to electronically determine segments of motion data of the aircraft; aggregating sequences of the segments of the motion data; comparing the aggregated segments of motion data to models of particular maneuvers; and determining the maneuver performed by the aircraft.

13 Claims, 8 Drawing Sheets

(56) References Cited

U.S. PATENT DOCUMENTS

| | | | |
|---|---|---|---|
| 2004/0199307 A1* | 10/2004 | Kipersztok et al. | 701/29 |
| 2005/0096873 A1* | 5/2005 | Klein | 702/184 |
| 2006/0126608 A1* | 6/2006 | Pereira et al. | 370/360 |
| 2006/0251507 A1* | 11/2006 | Braswell et al. | 415/13 |
| 2007/0168157 A1* | 7/2007 | Khibnik et al. | 702/182 |
| 2008/0036617 A1* | 2/2008 | Arms et al. | 340/679 |
| 2009/0083050 A1* | 3/2009 | Eltman et al. | 705/1 |
| 2009/0300379 A1* | 12/2009 | Mian et al. | 713/300 |
| 2010/0017049 A1* | 1/2010 | Swearingen et al. | 701/3 |
| 2010/0057277 A1* | 3/2010 | Goodrich et al. | 701/14 |
| 2010/0219987 A1* | 9/2010 | Isom et al. | 340/946 |
| 2010/0235108 A1* | 9/2010 | Adams et al. | 702/34 |
| 2010/0235109 A1* | 9/2010 | Zhao et al. | 702/34 |
| 2010/0308794 A1* | 12/2010 | Townsend et al. | 324/103 P |
| 2010/0315248 A1* | 12/2010 | Townsend et al. | 340/635 |
| 2011/0054721 A1* | 3/2011 | Goodrich et al. | 701/14 |
| 2011/0057071 A1* | 3/2011 | Sahasrabudhe et al. | 244/17.13 |
| 2013/0085672 A1* | 4/2013 | Stewart et al. | 701/528 |

OTHER PUBLICATIONS

Gill, J. J., "Lessons Learned From Rotary-and Fixed-Wing HUMS Applications", Aerospace Conference Proceedings, 2000 IEEE Mar. 18-25, 2000, Piscataway, NJ, USA, IEEE, vol. 6, Mar. 18, 2000, pp. 423-431.

Land, J. E., "HUMS—The Benefits—Past, Present and Future", Aerospace Conference, 2001, IEEE Proceedings. Mar. 10-17, 2001, Piscataway, NJ, USA, IEEE, Pascataway, NJ, USA, vol. 6, Mar. 20, 2001, pp. 3083-3094.

Extended European Search Report for International Application No. EP11155193, Sep. 21, 2011, 5 pages.

* cited by examiner

1. Damage estimation uses observed flight spectra as obtained from HUMS regime sequences which are further post processed via a <u>clustering algorithm</u>

| 11:14:51 | 40:Forward Flight to 0.8 Vne | 15 |
|---|---|---|
| 11:15:06 | 82-87:Generic Level Right Turn | 3 |
| 11:15:09 | 83:Generic Level Right Turn, 30deg AOB, 0.8 Vne | 10 |
| 11:15:19 | 44:Right Turn During Climb | 3 |
| 11:15:27 | 83:Generic Level Right Turn, 30deg AOB, 0.8 Vne | 29 |
| 11:15:56 | 44:Right Turn During Climb | 2 |
| 11:15:58 | 43:Steady Climb | 4 |

2. The algorithm reconstructs from low level sequences of HUMS regimes high level clusters of maneuvers whose durations and counts are relevant to the CRT analysis

| 11:14:51 | 40:Forward Flight to 0.8 Vne | 15 |
|---|---|---|
| 11:15:06 | 82-87:Generic Level Right Turn | 3 |
| 11:15:09 | 83:Generic Level Right Turn, 30deg AOB, 0.8 Vne | 10 |
| 11:15:19 | 44:Right Turn During Climb | 3 |
| 11:15:27 | 83:Generic Level Right Turn, 30deg AOB, 0.8 Vne | 29 |
| 11:15:56 | 44:Right Turn During Climb | 2 |
| 11:15:58 | 43:Steady Climb | 4 |

3. The algorithm parameters calibrated using fleet data and other sources and validated/fine tuned based on expert screening. Cluster durations may be increased based upon a calculated reliability factor

| 11:14:51 | 40:Forward Flight to 0.8 Vne | 15 |
|---|---|---|
| 11:15:06 | 82-87:Generic Level Right Turn | 3 |
| 11:15:09 | 83:Generic Level Right Turn, 30deg AOB, 0.8 Vne | 10 |
| 11:15:19 | 44:Right Turn During Climb | 3 |
| 11:15:27 | 83:Generic Level Right Turn, 30deg AOB, 0.8 Vne | 29 |
| 11:15:56 | 44:Right Turn During Climb | 2 |
| 11:15:58 | 43:Steady Climb | 4 |

Figure 3

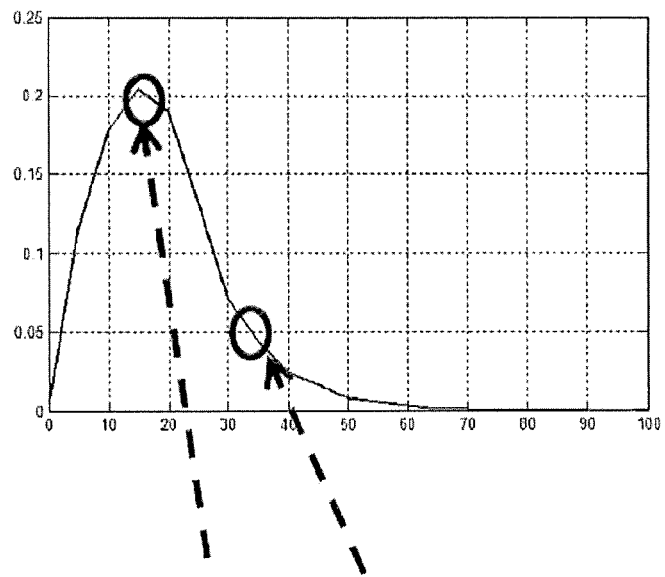
30 Degree Turn Maneuver Times Obtained from Fleet Parametric Roll Angle Data
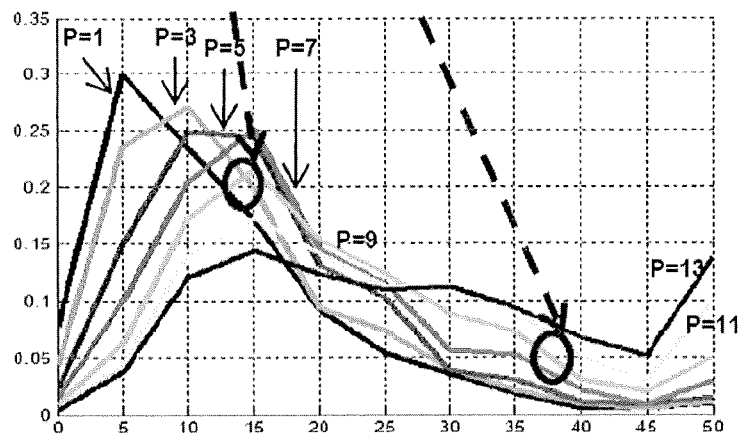
30 Degree Turn Maneuver Times Implied by Persistence Parameter in Clustering Algorithm
Figure 4

METHOD OF DETERMINING A MANEUVER PERFORMED BY AN AIRCRAFT

CROSS-REFERENCE TO RELATED APPLICATIONS

This application claims the benefit of U.S. provisional patent application Ser. No. 61/342,970 filed Apr. 21, 2010, the entire contents of which are incorporated herein by reference.

STATEMENT REGARDING FEDERALLY SPONSORED RESEARCH OR DEVELOPMENT

This invention was made with Government support under DTFACT-06-C-00002 awarded by the United States DOT/ FAA William Hughes Technical Center. The Government has certain rights in this invention.

BACKGROUND OF THE INVENTION

Health and usage monitoring systems (HUMS) are a common component in the flight deck avionics of a modern aircraft. The parameters that may be monitored by health and usage monitoring systems are extensive and may depend to some degree upon the configuration of the aircraft.

Among other functions, HUMS typically perform engine and drive train vibration monitoring, in order to detect mechanical faults and avoid mechanical failures. The HUMS typically consists of a variety of onboard sensors, algorithms, and data acquisition systems. For example, the following parameters may be monitored by HUMS. Speed probes and tachometer generators: the measurement of speed is of importance to ensure that a rotating component does not exceed limits with the risk of being overstressed. Temperature measurement: exceeding temperature limits or a tendency to run hot is often a prelude to a major component or system failure. Pressure measurement: a tendency to over-pressure or low pressure may be an indication of impending failure or a loss of vital system fluids. Acceleration: higher acceleration readings than normal may indicate that a component has been overstressed or that abnormal wear is occurring. The use of low-cycle fatigue algorithms may indicate blade fatigue, which could result in blade failure. Particle detection: metal particle detection may indicate higher than normal metal composition in an engine or gearbox oil system resulting from abnormal or excessive wear of a bearing which could fail if left unchecked.

Most HUMS systems when integrated with the flight deck avionics of a helicopter continuously monitor and log the above-mentioned parameters and would indicate to the pilot, via cockpit displays, when they have been exceeded. Even when the aircraft cockpit displays show normal, the data accumulated is regularly downloaded from the aircraft using a data transfer unit. The data may then be transferred to a ground-based computer and replay facility which performs the necessary data reduction and performance/trend algorithms, as well as providing a means of displaying the data. In this way it is possible to maintain a record of every aircraft and health and usage monitoring systems wherever installed in the fleet and to take the necessary actions when any unhealthy trends have been identified.

The level of HUMS functionality has led to increased safety that could be further improved by adding the capability of structural usage monitoring. Consequently, a comprehensive knowledge of actual aircraft usage would help assure safe operational procedures and usage profiles

SUMMARY OF THE INVENTION

Embodiments include a method of determining a maneuver performed by an aircraft having sensors for monitoring motion data, the method including: periodically sampling the sensors to electronically determine segments of motion data of the aircraft; aggregating sequences of the segments of the motion data; comparing the aggregated segments of motion data to models of particular maneuvers; and determining the maneuver performed by the aircraft.

The various features and advantages of this invention will become apparent to those skilled in the art from the following detailed description of the currently preferred embodiment. The drawings that accompany the detailed description can be briefly described as follows:

BRIEF DESCRIPTION OF THE DRAWINGS

FIG. 3 shows exemplary clustering of HUMS regime sequences;

FIG. 4 shows exemplary calibration of clustering parameter;

DETAILED DESCRIPTION OF THE PREFERRED EMBODIMENT

Figure 1A:
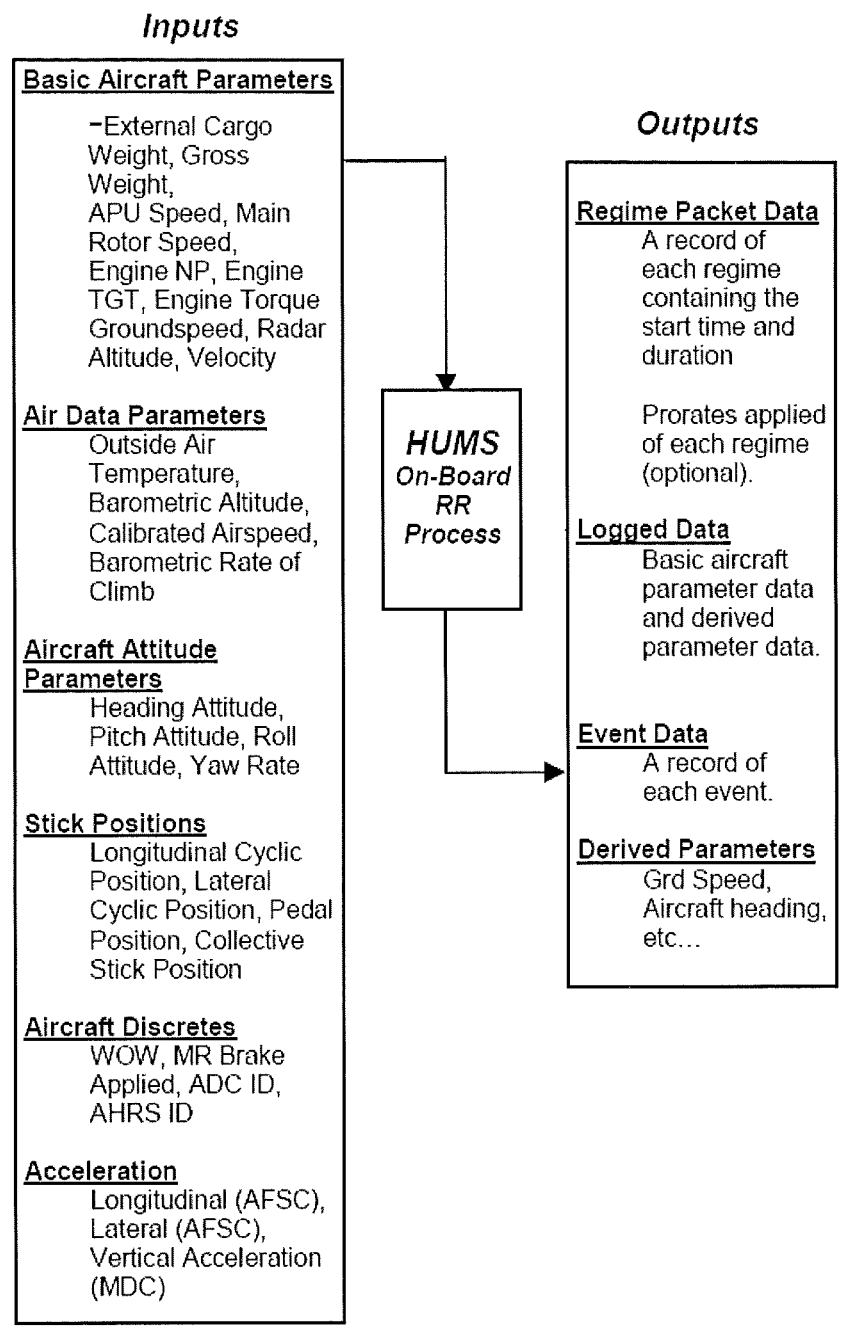
FIG. 1A is a block diagram of an exemplary HUMS.

Embodiments of the invention increase safety by adding the capability of structural usage monitoring. As shown in FIG. 1A, this is accomplished by acquiring comprehensive knowledge of actual aircraft usage by monitoring via regime recognition (RR), i.e., the flight maneuvers of the aircraft.

Definition of design usage has traditionally relied on developing a composite worst case (CWC) usage spectrum derived from the customer's detail specifications, legacy specifications, pilot surveys and historical knowledge of aircraft usage. The usage spectrum is a conservative estimate of the most severe operations expected in service.

Loads for regimes are initially determined through fatigue flight loads analysis, either using analytical flight simulation or by scaling appropriate test data. This is followed up by flight loads survey testing on prototype aircraft, where in-flight loads data for each maneuver are recorded from the instrumented components.

In embodiments of the invention, HUMS RR uses algorithms to identify numerous short regimes in place of an intended longer duration whole maneuver. Typically, a HUMS regime is a categorical map that corresponds to narrowly defined regions in the continuous parametric space.

Figure 1B:
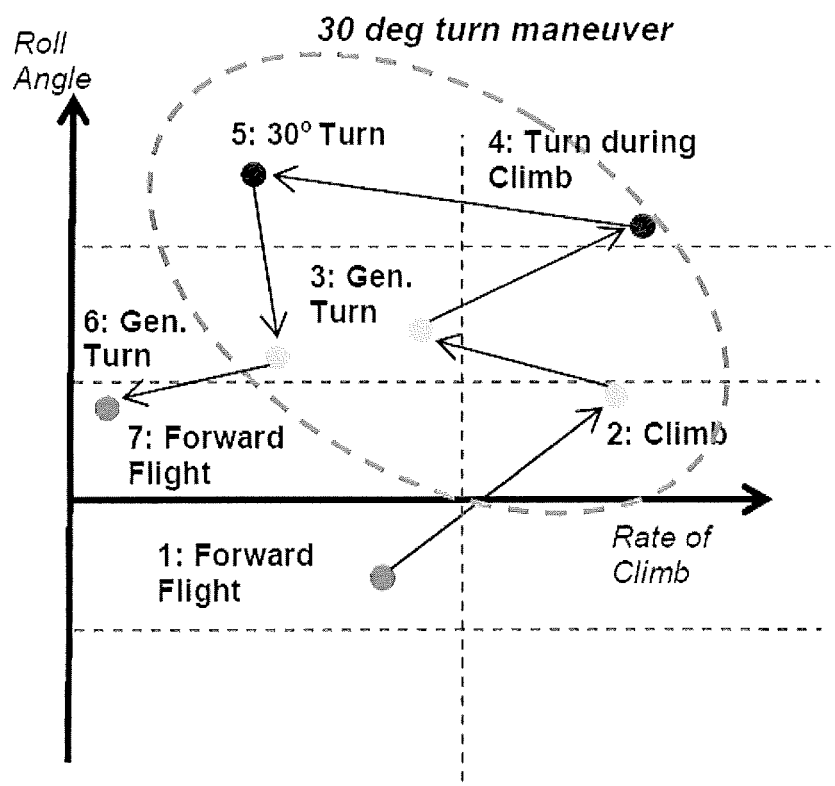
FIG. 1B shows exemplary HUMS toggling behavior root cause.

For example, FIG. 1B shows how several HUMS regimes can be recognized during a single maneuver. In FIG. 1B, the aircraft enters a turn from level flight at point number 1. While starting the turn, it may temporarily climb slightly in which HUMS identifies a climbing regime at point 2. If the rate of climb reduces past a certain level, HUMS might recognize a generic turn that has not reached a steady condition at point 3. If the rate of climb again fluctuates, HUMS may recognize a climbing turn as shown by point number 4 in FIG. 1B. Eventually, HUMS will recognize a 30 deg turn after the roll angle has crossed over a parameter bound, as shown by point number 5 in FIG. 1B. The turn recovery may go through similar fluctuations among several regimes (point 6) prior to returning to a level flight condition at point number 7.

Unfortunately, perturbations around the value of one or more parameters may alter the HUMS RR output. This phenomenon leads to difficulties with processing HUMS output by underestimating total percent time of a maneuver and over counting occurrences of the intended target maneuver. However because the regime parameter definitions are static and the physics of flight of the aircraft is predictable, it is hypothesized that a unique set of regimes are expected to be recognized every time the aircraft executes a turn maneuver.

Figure 2:
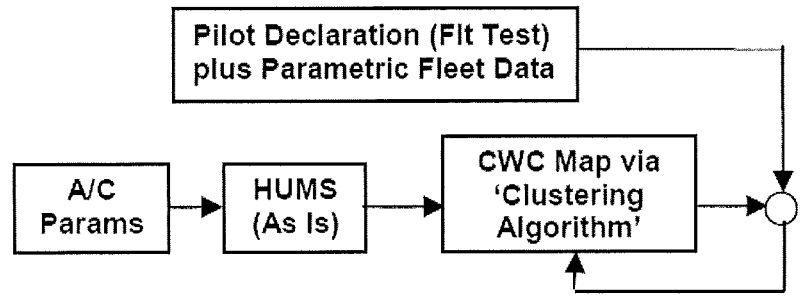
FIG. 2 is a block diagram of an exemplary credit validation scheme to reduce regime uncertainty.

In order to address this root cause, embodiments provide a method to effectively post-process the HUMS regime sequence data. As shown in FIG. 2, the existing HUMS installation will be used and the output post-processed to quantify the monitored aircraft usage. This is accomplished by appropriately mapping the HUMS regime sequence output into quantifiable CWC spectrum regimes. The CWC mapping process is optimized to reduce or minimize the uncertainty in the mapped regimes versus a set of truth data and to ensure conservative calculation of accumulated fatigue damage.

In order to map the HUMS output to the CWC maneuvers, a clustering algorithm aggregates HUMS regime sequence segments around an intended target maneuver of interest from the CWC spectrum. Clustering is used to solve the current problem and enables HUMS output to be used to accurately measure occurrences and durations.

FIG. 3 illustrates the outcome of the clustering algorithm. The process aggregates HUMS regime sequences that are not explicitly mapped to the intended target maneuver based on the following criteria.

The regime sequence segment is likely to be picked by HUMS during an intended target CWC maneuver. Because there is not a one-to-one correspondence between HUMS and CWC regimes, the target CWC maneuver must be described instead as a set of RR labels that most closely resemble it, i.e. the target set. These regime sequences around the target are known as cluster regimes (or clusters) and are determined via analysis of flight test data and engineering judgment.

The cluster regime does not exceed an expected duration that would indicate it is a correctly identified cluster regime that stands alone from the target. The duration is known as the persistence parameter and is tied empirically to the flight characteristics of the aircraft.

The cluster regimes that satisfy the persistence parameter must be in close proximity to the target maneuver in the HUMS sequence. A cluster is deemed valid only if it contains an element of the target set. Otherwise, it is considered an empty cluster.

The cluster definitions (target set and cluster regimes) must first be established and an initial persistence parameter chosen using flight test and fleet data. Next the persistence parameters are calibrated based on a sample of truth data comprised mainly of fleet information from which occurrence and duration of intended maneuvers are estimated via analysis of parametric data. Finally, the model is checked against all available truth from flight test and the fleet to determine its validity and quantify its reliability.

A calibration of the persistence parameters is preferably performed on a representative sample of fleet data. One method to do this is by histogram matching, as shown in FIG. 4. A calibrating flight parameter is queried from the sample of fleet data that is closely tied to the CWC maneuver of interest. For example, roll angle is a reasonable parameter by which to measure turns. Turns are identified by excursions to and from a near zero roll angle. The turn durations from the fleet are quantified and plotted on a histogram. The clustering algorithm is run with various persistence parameters and the cluster durations are plotted on histograms to compare against the one based on roll angle. As shown in the example in FIG. 4, a persistence of 9 seconds best fits the fleet data and is reasonable to expect from aircraft performance characteristics. Either a single persistence parameter can be employed or different values tailored to specific cluster maneuvers.

Figure 5:
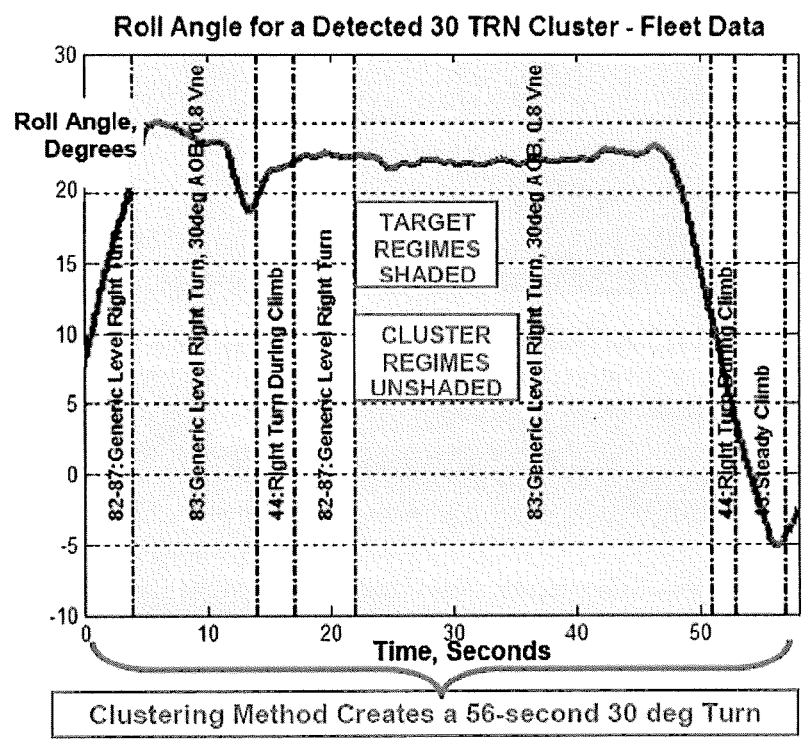
FIG. 5 shows fleet data and an exemplary cluster for a 30-degree turn maneuver.

FIG. 5 shows the details of a 30-degree turn cluster identified in the fleet data. The roll angle parameter from the recorded flight data is overlaid along with the HUMS regime sequence labels. Shaded regimes are members of the target set while the non-shaded regimes are members of the cluster set. The HUMS sequence identifies two occurrences of a generic 30 degree turn, in essence 'double counting' the maneuver. Furthermore, the total duration according to the targets is only 39 seconds versus the 56 second cluster duration. Here, the persistence parameter for the 30-degree cluster definition is tailored for different cluster regimes. The steady portion of the turn is shown to be 41 seconds.

Figure 6:
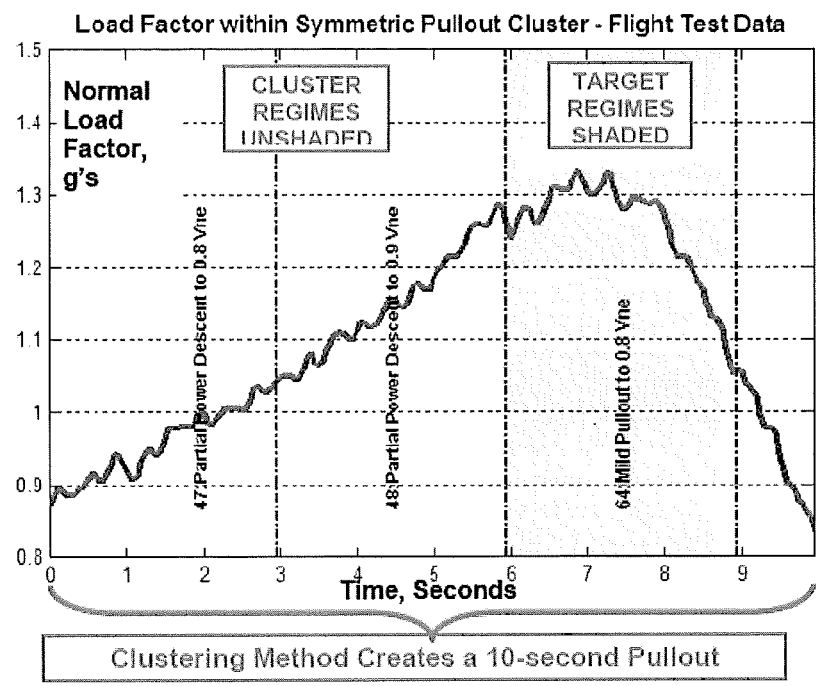
FIG. 6 shows flight test data and an exemplary cluster for a symmetric pullout maneuver.

FIG. 6 shows a result from the application of a symmetric pullout maneuver clustering algorithm. After calibrating with fleet data, the algorithm is applied to flight test data. In this case, the HUMS sequence recognizes a single occurrence of the pullout. However, the duration is only 3 seconds versus the 10 second cluster duration. If the pullout duration is considered to be from a 1.0 g loading condition, the actual duration is about 7.5 seconds. However to increase reliability, the clustering algorithm conservatively adds one second to each end of the cluster since the HUMS updates at a 1 Hz rate.

These examples show that the clustering algorithm represents the intended CWC maneuvers very well and can rectify HUMS toggling issues. Reliability factors must be built to deal with various sources of uncertainty. Intuitively there are three scenarios that could result from inaccuracies in the clustering methodology.

First, over-clustering: the choice of algorithm parameters may lead to extended cluster lengths where too many regime sequences are aggregated and individual instances of the target CWC maneuver are lost in a larger grouping. While large clusters typically imply more conservative damage estimation based on duration, maneuver counts will be low. Second, under-clustering: the choice of algorithm parameters, e.g. small persistence, may lead to fragmented clusters that do not capture the entire intended CWC target. This may lead to larger number of counts but smaller cluster durations. Third, misses: even if the RR algorithm performs as designed, there may be instances where the intended target maneuver is not detected.

Once these potential inaccuracies are investigated and quantified, appropriate revisions may be made and reliability factors developed to deal with residual errors.

Aircraft component life may be adjusted by calculating the regimes and associated stress encountered by an aircraft. One way to increase component life expectancy is to calculate credits. Calculation of these credits using a HUMS derived spectrum is subject to uncertainties, which must be addressed during various steps of the process in order to maintain the same accepted high levels of reliability in the calculated retirement times (CRT) analysis based upon the CWC spectrum. Since usage-based damage calculations depend on the observed HUMS regime sequences through mapping to CWC, it is the error in the mapped CWC regimes that determines the error in calculated damage. Quantifying error for this approach involves computing probability distributions for observed regimes given aircraft operations in any given maneuver. Success for determining appropriate reliability factors is increased by focusing on the damaging regimes for selected dynamic components, combining experimental data with fleet data to improve the accuracy of HUMS error estimates, and using knowledge of fatigue substantiating parameters and aircraft performance.

Figure 7:
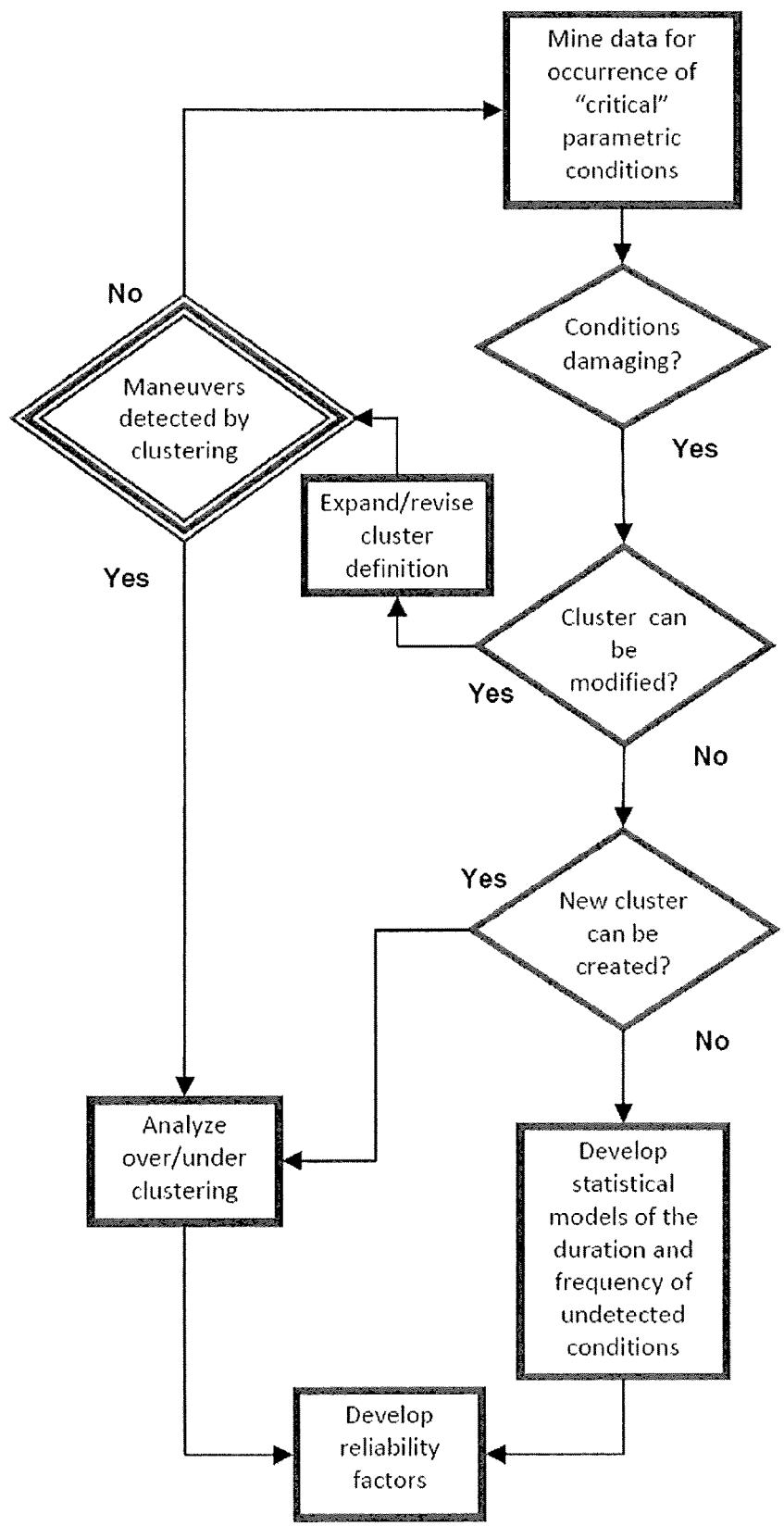
FIG. 7 shows an exemplary flow diagram of a cluster algorithm reliability assessment.

FIG. 7 shows the overall process for the clustering algorithm reliability assessment. After the algorithm has been defined for the CWC maneuver of interest, it is tested to determine how it detects occurrences of maneuvers in the validation data sets. Since the flight test data is used in the clustering algorithm, examination and filtering of such data prior to use is beneficial. Indications of over-clustering and under-clustering are noted and the persistence parameter tailored as necessary.

If there are missed targets, these are further investigated by examining available loads and state parameters to see if they are damage causing events. If so, the possibility of modifying the cluster definition is examined, for example expanding the target set definitions to include the damaging event. If implemented, the adjusted clustering algorithm is checked again with the validation data. If the existing cluster definitions can't be changed to include these regimes, another option is to create a new cluster definition for these maneuvers. These steps are repeated until the cluster definitions are optimized. Final statistics are determined to develop reliability factors for maneuver duration and counts. For those missed conditions that are not detected, similar statistics are generated and used to determine appropriate reliability factors.

Once the cluster definition for a CWC maneuver has undergone this process, no more improvement can be gained from the clustering algorithm capabilities, and the associated reliability can be determined through the analysis of errors for the three categories described earlier, i.e., over-clustering, under-clustering, and misses.

The reliability process described applies to the estimate of accrued actual part damage based on recorded HUMS data. Any missing data in the HUMS records are filled with the original design CWC usage. When calculated the UBM credit, future usage is assumed to be CWC.

The reliability model for credit validation compliance will also provide data to be considered for a controlled introduction to service strategy. Such a plan includes a gradual transition from the current time-based practice. During the time that maintenance decisions are being made via time-based methods, independent verification means may be employed to ensure correctness of HUMS based damage computations.

Although particular step sequences are shown, described, and claimed, it should be understood that steps may be performed in any order, separated or combined unless otherwise indicated and will still benefit from the embodiments of the invention.

The foregoing description is exemplary rather than defined by the limitations within. Many modifications and variations of the embodiments of the invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A method of determining a maneuver performed by an aircraft having sensors for monitoring motion data, the method comprising:
    periodically sampling the sensors to electronically determine segments of motion data of the aircraft;
    aggregating sequences of the segments of the motion data;
    comparing the aggregated segments of motion data to models of particular maneuvers; and
        determining the maneuver performed by the aircraft;
        wherein the segments of motion data are generated by a health and usage monitoring system (HUMS);
        wherein the segments of motion data generated by the HUMS are HUMS regime sequences;
        wherein aggregating sequences of the segments of the motion data includes using a clustering algorithm to aggregate the HUMS regime sequences into a cluster.

2. The method of claim 1 wherein:
the cluster is associated with a persistence parameter.

3. The method of claim 2 further comprising:
calibrating the clustering algorithm to select a selected persistence parameter for the cluster.

4. The method of claim 3 wherein:
calibrating the clustering algorithm includes executing the clustering algorithm with a plurality of persistence parameters and selecting the selected persistence parameter from the plurality of persistence parameters.

5. The method of claim 4 wherein:
selecting the selected persistence parameter from the plurality of persistence parameters includes comparing cluster data for the plurality of persistence parameters to fleet parametric data.

6. The method of claim 5 wherein:
comparing cluster data for the plurality of persistence parameters to fleet parametric data includes comparing histograms of the cluster data for the plurality of persistence parameters to a histogram of the fleet parametric data.

7. The method of claim 2 further comprising:
analyzing the cluster to detect an over-clustering condition in which too many HUMS regime sequences are included in the cluster.

8. The method of claim 7 further comprising:
adjusting the persistence parameter for the cluster upon detecting the over-clustering condition.

9. The method of claim 2 further comprising:
analyzing the cluster to detect an under-clustering condition in which too few HUMS regime sequences are included in the cluster.

10. The method of claim 9 further comprising:
adjusting the persistence parameter for the cluster upon detecting the under-clustering condition.

11. The method of claim 1 further comprising:
analyzing the cluster to detect a miss condition in which the cluster does not represent the maneuver.

12. The method of claim 11 further comprising:
creating a new cluster definition upon detecting a miss condition.

13. The method of claim 1 further comprising:
developing a reliability factor for the cluster.

* * * * *